United States Patent Office 3,579,506
Patented May 18, 1971

3,579,506
α-AMINOISOTHIAZOLYLACETIC ACIDS AND THEIR PENICILLIN AND CEPHALOSPORIN DERIVATIVES
Raymond Urgel Lemieux and Rintje Raap, Edmonton, Alberta, Canada, assignors to R & L Molecular Research Ltd., Edmonton, Alberta, Canada
No Drawing. Filed Oct. 23, 1968, Ser. No. 770,068
Int. Cl. C07d 99/24, 99/16
U.S. Cl. 260—239.1
13 Claims

ABSTRACT OF THE DISCLOSURE

α-Aminoisothiazolylacetic acids and derivatives thereof have been prepared and used in the preparation of α-aminoisothiazolylacetic acid derivatives of 6-aminopenicillanic acid and 7-aminocephalosporanic acid which have been found to be useful as antibacterial agents.

BACKGROUND OF THE INVENTION

This invention relates to new synthetic compounds which are useful as antibacterial agents. These antibacterial agents, which are of the penicillin and cephalosporin classes, have been found to be effective therapeutic agents in the treatment of infectious disease due to Gram-positive and Gram-negative bacteria in poultry and animals, including man. They are also useful as nutritional supplements in animal feeds and as agents for the treatment of mastitis in cattle.

These antibiotics are obtained by acylating, either chemically or by fermentation, 6-aminopenicillanic acid or 7-aminocephalosporanic acid by methods known in the art. The penicillins and cephalosporins of this invention possess the usual properties associated with the general class of penicillin and cephalosporin-type antibiotics.

Prior art

Various derivatives of penicillin and cephalosporin antibiotics are known. For example, U.S. Pat. 3,303,193 disclosed 7-(α-aminophenylacetamido)-cephalosporanic acid (cephaloglycin), and U.S. Pats. 2,985,648, 3,140,282, 3,373,156, 3,308,023, 3,342,677 and British Pats. 903,785, 918,169, 978,178, 991,586, 1,033,257 disclose α-aminobenzylpenicillin and α-aminomethylpenicillin. It is also known that isothiazolyl derivatives of 6-aminopenicillanic and 7-aminocephalosporanic acid are useful antibiotics, see U.S. 3,271,407.

SUMMARY OF THE INVENTION

This invention relates to α-aminoisothiazolylacetic acids, its esters and salts, and to penicillin and cephalosporin derivatives thereof. The compounds within this invention can be represented by the general formula

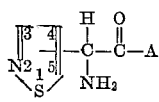

wherein A can be a hydroxy group, an esterified hydroxyl group, a 6-aminopenicillanic acid nucleus (6-APA) or a 7-aminocephalosporanic acid nucleus (7-ACA), as hereinafter defined. The terms "6-aminopenicillanic acid nucleus" and "7-aminocephalosporanic acid nucleus" refer, respectively, to the following structures

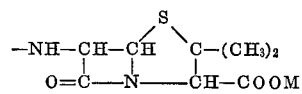

and

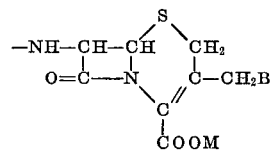

wherein B is hydrogen, hydroxyl, (lower)alkanoyloxy containing 2 to 8 carbon atoms, e.g., acetoxy, propionoyloxy, butanolyloxy, pentanolyloxy, and the like, benzoyloxy, a quaternary ammonium radical, e.g., pyridinium, quinolinium, picolinium, lutidinium, or, when taken together with M, a monovalent carbon-oxygen bond; and M is hydrogen, a pharmaceutically acceptable nontoxic cation, an anionic charge when B is a quaternary ammonium radical, or, when taken together with B, a monovalent carbon-oxygen bond. Also included within the scope of the invention are the pharmaceutically acceptable nontoxic salts of these compounds, particularly salts of the antibiotics. In these compounds, the isothiazole ring, with the positions numbered as shown, is joined to the remainder of the molecule via the 3,4, or 5-position.

The term, "esterified hydroxy group," as used above, refers to a carboxylic hydroxyl group which has been neutralized or esterified by replacement of the hydrogen with an alkyl group or a cation such as a metal, or an ammonium radical. Accordingly, A can be, inter alia, an alkoxy group, preferably having from 1 to about 4 carbon atoms or a metaloxy group, preferably of an alkali or alkaline earth metal.

An object of the instant invention is to provide novel α-amino derivatives of isothiazolyacetic acids which can be used in the preparation of novel penicillins and cephalosporing having value as animal feed supplements, and antibacterial agents for the treatment of infectious diseases in poultry and animals, including man, and for the decontamination of objects and surfaces bearing susceptible organisms of the Gram-positive and Gram-negative groups of bacteria.

This and other closely related objectives have been achieved by providing the compounds herein described.

DETAILED DESCRIPTION

The invention is particularly concerned with α-aminoisothiazolylacetic acids, i.e., α-amino-3-isothiazolylacetic acid, α-amino-4-isothiazolylacetic acid, and α-amino-5-isothiazolylacetic acid; the corresponding 6-[α-aminoisothiazolylacetamido]penicillanic acids, 7 - [α - aminoisothiazolylacetamido]cephalosporanic acids, and decephalosporanic acid derivatives and with the syntheses of the α-aminoisothiazolylacetic acids.

The antibiotic compounds of this invention can be represented by the general formula

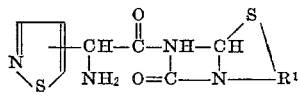

wherein $R^1$ is selected from the group consisting of

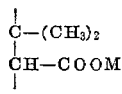

and

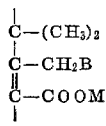

wherein B is hydrogen, hydroxyl, (lower)alkanoyloxy containing 2 to 8 carbon atoms, e.g., acetoxy, propionoyloxy, butanoyloxy, pentanoyloxy, etc., benzoyloxy, a quaternary ammonium radical, e.g., pyridinium, quinolinium, picolinium, lutidinium, or, when taken together with M, a monovalent carbon-oxygen bond; and M is hydrogen, a pharmaceutically acceptable nontoxic cation, an anionic charge when B is a quaternary ammonium radical, or, when taken together with B, a monovalent carbon-oxygen bond and the nontoxic pharmaceutically acceptable salts thereof. Such salts include (1) nontoxic, pharmaceutically acceptable salts of the carboxylic acid group, e.g., sodium, potassium, calcium, and aluminum salts, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabiethylenediamine, N-(lower)alkylpiperidine, e.g., N-ethylpiperidine, and other amines which have been used to form salts with benzylpenicillin; (2) and the nontoxic acid addition salts thereof, i.e., salts of the basic nitrogen, including the inorganic acid addition salts such as the hydrochloride, hydrobromide, hydroiodide, sulfate, sulfamate and phosphate and the organic acid addition salts such as the maleate, acetate, citrate, gluconate, oxalate, succinate, benzoate, tartrate, fumarate, malate, mandelate, ascorbate and the like. The preferred salts are the hydrochloride, sulfate, and phosphate salts. Another preferred form of the invention is the "free acid" which may exist as a zwitter ion.

In the treatment of bacterial infections in man, the compounds of this invention are administered both orally and parenterally, in accordance with conventional procedures for antibiotic administration, in an amount of from about 5 to 60 mg./kg./day and preferably about 15 mg./kg./day in divided dosages, e.g., three or four times a day. They are administered in dosage units containing, for example, 62.5, 125, 250 or 500 mg. of active ingredient with suitable physiologically acceptable carriers or excipients. The dosage units can be in the form of liquid preparations such as solutions, suspensions, dispersions or emulsions or in solid form such as tablets, capsules, and the like.

The physiologically acceptable carrier may be any pharmaceutical carrier convenient for administration. The carrier may be water containing gelatin, acacia, algenate, dextran, sodium carboxymethyl cellulose, polyvinyl pyrrolidone or the like. The inorganic acid addition salts such as the hydrochloride are more soluble in water than the "free acid" form and are therefore preferred for use in solutions, as for injection.

Since the $\alpha$-carbon of the aminoisothiazolylacetic acid moiety, to which the $\alpha$-amino group is attached, is an asymmetric carbon atom, the compounds of this invention can exist in two optically active isomeric forms, the D and L forms, as well as in the form of a racemic mixture, identified as the DL form. All such optical isomer forms of the compounds and mixtures thereof are within the scope of the invention.

The antibiotic products of the present invention are prepared by coupling the desired $\alpha$-aminoisothiazolylacetic acid side chain or its functional equivalent, preferably having the $\alpha$-amino group blocked, with the 6-aminopenicillanic acid or the 7-aminocephalosporanic acid nucleus, preferably in the form of a neutral salt, e.g., the sodium or triethylamine salt. Alternatively, the penicillanic or cephalosporanic acid nucleus may be in the form of an easily hydrolyzed ester such as the activated esters disclosed in copending U.S. patent application Ser. No. 706,789 filed Feb. 20, 1968.

Compounds which are functionally equivalent to the free isothiazolylacetic acid for the purpose of acylating the primary amino group of the 6-aminopenicillanic acid or 7-aminocephalosporanic acid nucleus, as defined herein, include the corresponding carboxylic acid chlorides, bromides, acid anhydrides, including mixed anhydrides, particularly the mixed anhydrides prepared from stronger acids such as the lower aliphatic monoesters of carbonic acid of alkyl and aryl sulfonic acids and of more hindered acids such as diphenylacetic acid. In addition, an acid azide or an active ester or thioester (e.g., with p-nitrophenol, thiophenol, thioacetic acid) may be used or the free acid itself may be coupled with 6-aminopenicillanic acid by the use of enzymes or of a carbodiimide reagent [cf. Sheehan and Hess, J. Amer. Chem. Soc., 77, 1067 (1955)], or of alkynylamine reagent [cf. R. Buijle and H. G. Viehe, Angew. Chem. International Edition, 3, 582 (1964)], or of a ketenimine reagent [cf. C. L. Stevens and M. E. Monk, J. Am. Chem. Soc., 80, 4065 (1958)] or of an isoxazolium salt reagent [cf. R. B. Woodward, R. A. Olofson and H. Mayer, J. Am. Chem. Soc., 83, 1010 (1961)]. Another equivalent of the acid chloride is a corresponding azolide, i.e., an amide of the corresponding acid whose amide nitrogen is a member of a quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential. The methods for carrying out these reactions to produce a penicillin and the methods used to isolate the penicillins so-produced are well-known in the art.

The blocking group is then removed, e.g., by catalytic hydrogenation, and the $\alpha$-amino compound is isolated by conventional techniques, e.g., by removal of the solvent, followed by recrystallization.

A preferred blocking group, for protection of the amino group, is the p-nitrocarbobenzoxy group which can be conveniently removed from the antibiotic by hydrogenation using a catalyst comprising 10% palladium on charcoal. In the case of the $\alpha$-amino-3-isothiazolylacetamido and the $\alpha$-amino-5-isothiazolylacetamido compounds, the use of the carbobenzoxy group (Cbz) as a blocking group is less preferred. An illustrative synthesis by which the isomeric 6 - [$\alpha$ - aminoisothiazolylacetamido]pencillanic acids have been successfully prepared is illustrated by the following scheme

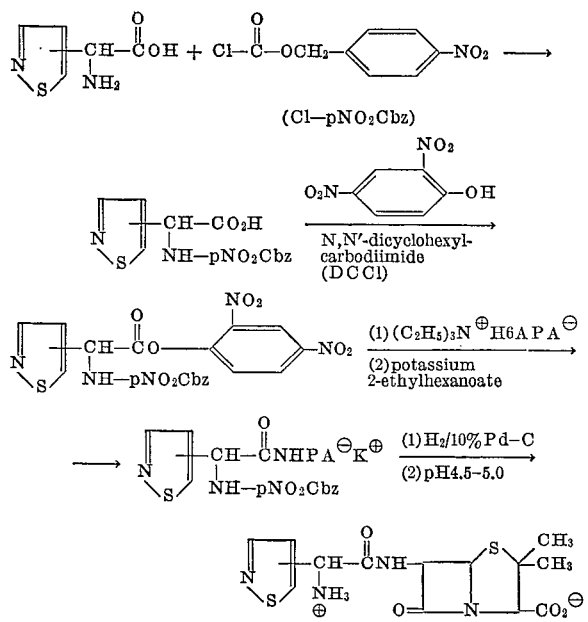

The 2,4-dinitrophenyl esters are preferred as the active esters instead of the p-nitrophenyl esters since the latter may react rather slowly with triethylammonium 6-aminopenicillanate. In the reaction between the active esters and the triethylamine salt of 6–APA or 7–ACA generally an equivalent amount of triethylamine was added to neutralize the dinitrophenol. In the case of the optically active activated esters of the 4-isomer, the dinitrophenol had to be neutralized after the reaction was finished as it was found that the addition of even a small amount of free triethylamine to the activated esters, results in a very rapid racemization. In the case of the 5-isomer the 2,4-dinitrophenyl ester was unstable and had to be prepared at about $-20°$ C.

Nuclear magnetic resonance spectroscopy (N.M.R.) at 60 mHz. presents an excellent method to distinguish between the two epimeric forms of 6-[α-amino-4-isothiazolylacetamido]penicillanic acid as is shown in Table I. The β-lactam hydrogens appear to be slightly more shielded in the D(−)-epimer. A more characteristic difference is displayed by the *geminal* dimethyl group. In the L(+)-epimer, the dimethyl group appears as one sharp singlet, whereas in the D(−)-epimer it appears as two singlets, indicating that in the D(−)-epimer the two methyl groups are experiencing a different magnetic environment.

TABLE I

[NMR spectral parameters of 6-[α-amino-4-isothiazolylacetamido]penicillanic acids [1]]

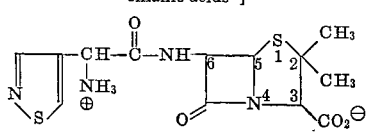

| | | Chemical shifts, τ-values | | | | | | |
|---|---|---|---|---|---|---|---|---|
| Epimer [2] | C³H | C² CH₃ / CH₃ | H C⁵ | H C⁶ | Isothiazole H's | α-H | | J5,6 (c.p.s.) |
| D(−) | 5.82 | 8.55, 8.60 | 4.46 | 4.58 | 0.82, 1.32 | 4.43 | | 3.8 |
| L(+) | 5.78 | 8.50 | 4.37 | 4.50 | 0.83, 1.33 | 4.43 | | 4.5 |

[1] Solvent: D₂O.
[2] The D(−)-epimer was prepared from (−)-α-amino-4-isothiazolylacetic acid, the L(+) from the corresponding (+)-amino acid.

The α-aminoisothiazolylacetic acids can be prepared as described and illustrated below.

α-Amino-3-isothiazolylacetic acid can be provided by the classical method for synthesis of an amino acid via a hydantoin as shown below

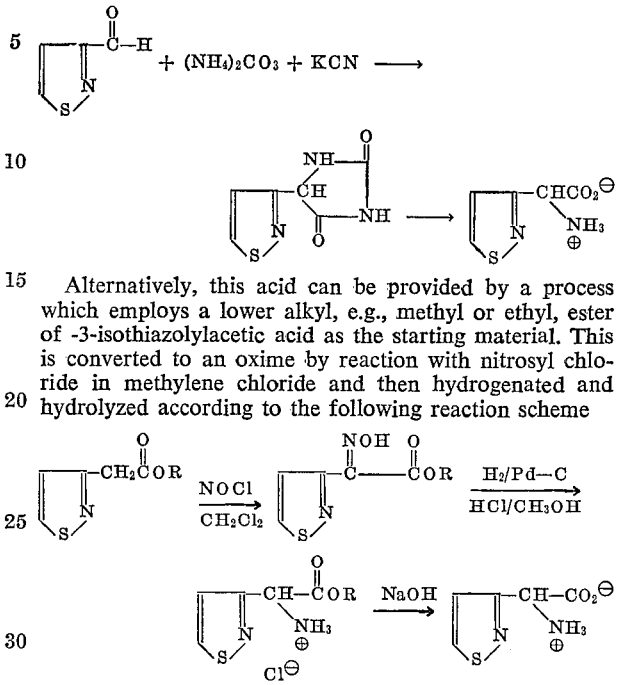

Alternatively, this acid can be provided by a process which employs a lower alkyl, e.g., methyl or ethyl, ester of -3-isothiazolylacetic acid as the starting material. This is converted to an oxime by reaction with nitrosyl chloride in methylene chloride and then hydrogenated and hydrolyzed according to the following reaction scheme

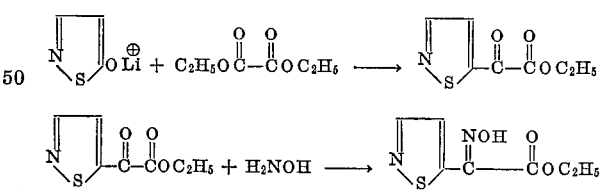

wherein R is lower alkyl, preferably methyl or ethyl.

α-Amino-5-isothiazolylacetic acid can be prepared by hydrogenation and hydrolysis of the corresponding oximinoacetate as described in the alternative method for the 3-isomer described above. The oximinoacetate was prepared by reaction of a lower alkyl ester of 5-isothiazolylacetic acid with nitrosyl chloride as described above for the 3-isomer. An alternate method for the preparation of the oximinoacetate involved the use of isothiazolyllithium [Caton et al., J. Chem. Soc., 446 (1964)] and an ether solution of diethyl oxalate at a temperature of about $-65°$ C. to provide 5-isothiazolylglyoxylate. The resulting keto ester is then reacted with hydroxylamine. The reaction scheme for this preparation is shown below

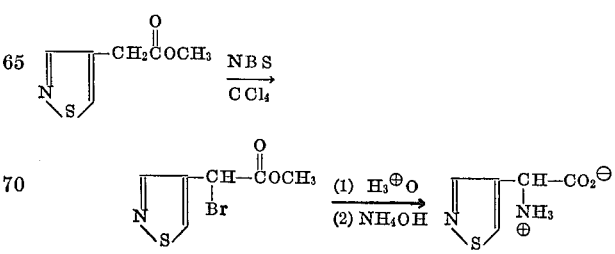

α-Amino - 4 - isothiazolylacetic acid can be prepared from lower alkyl, e.g., methyl or ethyl, α-bromo - 4 - isothiazolylacetate which in turn is prepared by bromination of 4-isothiazolylacetate with N-bromosuccinimide (NBS). Hydrolysis of the bromo ester followed by reaction of the bromo acid with ammonium hydroxide gives the amino acid, as shown below.

The methyl 4-isothiazolylacetate can be prepared by an Arndt-Eister synthesis from isothiazole-4-carboxylic acid, which in turn could be prepared ether by a permanganate oxidation of 4-methyl-isothiazole or from isothiazole via bromination and cyanation

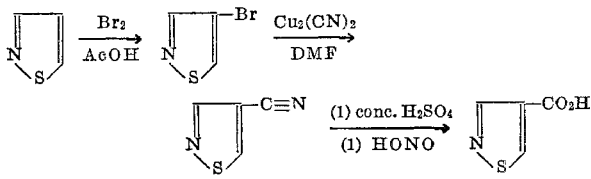

More conveniently the methyl 4-isothiazolylacetate could be prepared from 4-methylisothiazole [Hubenett et al., Angew. Chem., Intern. Ed. Engl. 2, 714 (1963)] by bromination followed by cyanation and methanolysis. The intermediates were not isolated in this reaction. An attempt to isolate 4-bromomethylisothiazole resulted in a rapid decomposition of this product.

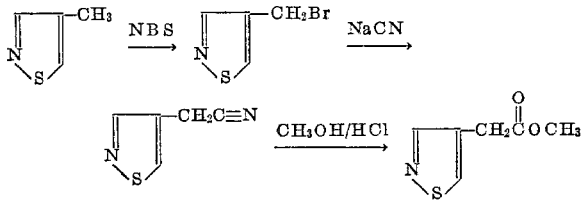

α-Bromo - 4 - isothiazolylacetic acid can be converted quantitatively into α-azido - 4 - isothiazolylacetic acid with sodium azide in aqueous acetone. A good procedure for resolution of this azido acid comprises adding an aqueous solution of cinchonine hydrochloride to an aqueous solution of sodium α-azido - 4 - isothiazolylacetate. The precipitated salt was found to be optically pure after one or two recrystallizations from methanol. The levorotatory azido acid can be isolated from this salt. The partially resolved dextrorotatory azido acid isolated from the aqueous solution was obtained optically pure after two recrystallizations of its ephedrine salt from ethyl acetate. The optically active α-azido - 4 - isothiazolylacetic acids racemized very rapidly in dilute sodium hydroxide. In 0.12 N aqueous sodium hydroxide at about 25° C., the first order rate constant was found to be 0.0146 min.$^{-1}$ (half-life time=32 minutes). This is considerably faster than the rate of racemization of the structurally related α-azido - 3 - thienylacetic acid [Gronowitz et al., Arkiv Kemi. 23, 129 (1964)] and α-azidophenylacetic acid, for which first order rate constants of 0.0088 mm.$^{-1}$ and 0.0038 mm.$^{-1}$, respectively in 1.0 N aqueous sodium hydroxide have been reported (Gronowitz et al., supra).

When α-azido - 4 - isothiazolylacetic acid was treated with 2 N aqueous sodium hydroxide, a rapid gas evolution took place and, after acidification, 4-isothiazolylglyoxylic acid could be isolated in good yield.

The optically active α-azido - 4 - isothiazolylacetic acids could be hydrogenated in good yields to the optically active α-amino - 4 - isothiazolylacetic acids, using palladium or charcoal as a catalyst. The direction of rotation was maintained in these reductions. The dextrorotatory amino acid was also obtained directly from D,L-α-amino-4-isothiazolylacetic acid by fractional recrystallization of the d-camphor - 10 - sulfonic acid salt from isobutyl alcohol.

Although the absolute configuration of the (+) and (−)isomer of α- amino - 4 - isothiazolylacetic acid was not established, empirical evidence suggests the (−)isomer has the D-configuration and the (+)isomer the L-configuration. The D-configuration of the structurally closely related α-aminophenylacetic acid and α-amino-3-thienylacetic acid (Gronowitz et al., supra) are both levorotatory, as shown in Table II, below.

Table II

| | [α]D (water) |
|---|---|
| D(−) - α - aminophenylacetic acid | −111° |
| D(−) - α - amino - 3 - thienylacetic acid | −100° |
| (−) - α - amino - 4 - isothiazolylacetic acid | −76° |

The penicillin derived from (−)-α-amino-4-isothiazolylacetic acid has a considerably better antibacterial activity than the penicillin derived from the (+)isomer. The penicillin derived from D(−) - α - aminophenylacetic acid is more active than that derived from the enantiomer [Doyle et al., J. Chem. Soc., 1440 (1962)].

Table III lists the nuclear magnetic resonance spectral parameters of the three isomeric D,L-α-aminoisothiazolylacetic acids.

TABLE III

[D,L-α-aminoisothiazolylacetic acids]

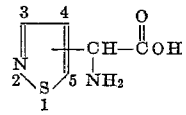

| Isomer | Decomposition point, °C. | Nuclear magnetic resonance data [1] (τ-values) | | | |
|---|---|---|---|---|---|
| | | H$^3$ | H$^4$ | H$^5$ | α-H |
| 3-isomer | 144–145 | | 2.35 | 0.97 | 4.13 |
| 4-isomer [2] | 199–200 [3] | 0.96 [4] (1.36) | | [3] 0.60 [4] (0.93) | 4.13 [4] (4.87) |
| 5-isomer [5] | 175–176 | 1.14 | 2.08 | | 3.94 |

[1] Solvent: Trifluoroacetic acid.
[2] Coupling constant J$^{4,5}$=5.0 c.p.s.
[3] The assignment of H$^3$ and H$^5$ may be reversed.
[4] Solvent: D$_3$O.
[5] Coupling constant J3,4=1.8 c.p.s.

The following examples illustrate the principles and practice of this invention, and they are intended to exemplify rather than to limit the invention.

In the examples, the Minimum Inhibitory Concentration (M.I.C.), expressed in micrograms per milliliter (mcg./ml.), indicates in vitro antimicrobial activity as determined by the serial tube dilution method.

In vivo activity is indicated by the minimum curative dose (CD$_{50}$) expressed as the minimum number of milligrams per kilogram of body weight of the test animal necessary to cure infection in fifty percent of the test animals. Unless indicated to the contrary, the CD$_{50}$ data given herein was obtained on mice.

EXAMPLE 1

Methyl α-oximino-3-isothiazolylacetate

A solution of methyl 3-isothiazolylacetate (42.0 g., 0.268 mole) and nitrosyl chloride (28 g., 0.43 mole) in 250 ml. of methylene chloride was briefly exposed to ultraviolet light. Within 5–10 minutes an exothermic reaction started and a white solid precipitated. The exothermic character of the reaction necessitated occasional cooling with ice. The reaction mixture was left at room temperature overnight. The oxime hydrochloride (24.0 g., M.P. 100–110° (dec.)) was filtered off and shaken with 50 ml. of a saturated aqueous sodium chloride solution. The oxime was extracted with five 40 ml. portions of ethyl acetate. The combined ethyl acetate extracts were dried. The residue obtained after removal of the solvent was dissolved in benzene. A small amount of insoluble by-product (2 g.) was filtered off and the benzene was removed, leaving 21 g. (42%) of oily residue which slowly crystallized. The methyl α-oximino-3-isothiazolylacetate material melted over a wide range (35–75°) and is probably a mixture of the syn-and the anti-isomer. Neutralization equivalent: 206 (calcd.: 186). This material was used for the next step without further purification.

Crude ethyl α-oximino-3-isothiazolylacetate was made in a similar way from ethyl 3-isothiazolylacetate (61% yield).

EXAMPLE 2

Methyl α-amino-3-isothiazolylacetate hydrochloride

A mixture of methyl α-oximino-3-isothiazolylacetate (16.0 g., 0.086 mole), hydrogen chloride (6 g., 0.16 mole), 10% palladium on charcoal (5 g.) and 300 ml. of methanol was hydrogenated at 45 p.s.i. for 24 hours. The mixture was filtered and the solvent of the filtrate removed under reduced pressure. The solid residue was dissolved in 40 ml. of methanol by heating, and 100 ml. of ether was added. After cooling, the white precipitate of methyl α-amino-3-isothiazolylacetate hydrochloride was filtered off. Yield: 13.8 g. (77%), M.P. 175–176° (dec.). The N.M.R. spectrum (in trifluoroacetic acid) contains doublets, with spacings of 4.8 c.p.s., at τ 0.95 and 2.32 ascribed to the 5- and 4-isothiazole protons respectively, and singlets at τ 4.03 (α–H) and 5.99 ($OCH_3$). The integrated areas were in agreement with the assignments.

Ethyl α-amino - 3 - isothiazolylacetate hydrochloride, M.P. 152–153° (dec.), was similarly prepared from crude ethyl α-oximino-3-isothiazolylacetate (42% yield).

EXAMPLE 3

5-(3-isothiazolyl)hydantoin

To a stirred mixture of 3-formylisothiazole (24.0 g., 0.233 mole), ammonium carbonate (80.5 g., 0.512 mole), ethanol (233 ml.) and water (150 ml.) there was added a solution of potassium cyanide (18.1 g., 0.279 mole) in water (83 ml.) dropwise over a 45 minute period, at 0° C. When the addition was complete, the reaction mixture was stirred at room temperature overnight. Most of the ethanol was then removed under reduced pressure. The residue was heated to 90° C. for 5 minutes, cooled, filtered, and extracted with two 100 ml. portions of methylene chloride. The aqueous solution was brought to pH 7 with concentrated hydrochloric acid, and after some tarry precipitate was removed, the pH was lowered to 1. The solution was concentrated and cooled at 0° C. The brown colored 5-(3-isothiazolyl)hydantoin (10.0 g., 23%), M.P. 90–100° C., was used to prepare the amino acid without further purification.

EXAMPLE 4

α-Amino-3-isothiazolylacetic acid (A) From methyl α-amino-3-isothiazolylacetate hydrochloride.—To a cold solution of methyl α-amino-3-isothiazolylacetate hydrochloride (15.6 g., 0.075 mole) in 37 ml. of water there was added 60 ml. of 3 N methanolic sodium hydroxide. The reaction mixture was kept at room temperature for one hour, then the pH of the solution was brought to 5.6 by the addition of acetic acid. After the mixture had been cooled, the precipitated solid was filtered off. The solid was dissolved in the minimum amount of boiling water and the resulting solution was treated with decolorizing carbon. Upon cooling, the α-amino-3-isothiazolylacetic acid crystallized as shiny white platellettes which when filtered off amounted to 6.3 g., M.P. 141–142° C. (d.). From the filtrate an additional 1.2 g. of the amino acid was isolated. Total yield: 7.5 g. (64%). The N.M.R. spectrum is given in Table III, above.

α-Amino-3-isothiazolylacetic acid was also prepared by hydrolysis of ethyl α-amino-3-isothiazolylacetate hydrochloride (56% yield).

(B) From 5(3-isothiazolyl)hydantoin.—A soution of 5(3-isothiazolyl)hydantoin (10.0 g., 0.0545 mole) in 120 ml. 3 N aqueous sodium hydroxide was heated at 100° C. for 16 hours. After cooling the mixture was slurried with 200 ml. of Dowex 50W–X8 H+ form ion-exchange resin (evolution of carbon dioxide, then added to a column containing an addition 100 ml. of ion-exchange resin. The column was washed with water until the eluate was only slightly acidic. Next the pronuct was eluted with 0.3 N ammonium hydroxide. The ninhydrin positive fraction was concentrated to dryness. The brown colored α-amino-3-isothiazolylacetic acid (5.8 g., 16% overall yield), M.P. 140–145° C. (dec.), could be recrystallized from water-ethanol-ether which raised the melting point to 144–145° C. (dec.). The N.M.R. spectrum is reported in Table III, above.

*Analysis.*—Calc'd for $C_5H_6N_2O_2S$: C, 37.96; H, 3.82; N, 17.71; S, 20.27. Found (percent): C, 38.14; H, 3.99; N, 17.96; S, 20.40.

EXAMPLE 5

D,L-α-N-p-nitrocarbobenzoxyamino)-3-isothiazolylacetic acid

To a suspension of D,L-α-amino-3-isothiazolylacetic acid (15.8 g., 0.10 mole) in 200 ml. of water there was added 120 ml. 2 N aqueous sodium hydroxide, followed by 100 ml. of tetrahydrofuran. The mixture was cooled in ice and under stirring a solution of p-nitrobenzyl chloroformate (25.9 g., 0.12 mole) in 100 ml. of tetrahydrofuran was added rapidly in 15 minutes. The mixture was left in the ice-bath for an additional 30 minutes, then 200 ml. of cold water was added to the mixture. Some solid was filtered off, and the filtrate was washed with three 150 ml. portions of ether. The aqueous layer was cooled in ice, layered with 150 ml. of ethyl acetate, and with stirring, brought to pH 2.0 by the addition of 3 N aqueous sulfuric acid. The aqueous solution was then extracted with two additional 150 ml. portions of ethyl acetate. The combined extracts were dried and concentrated to a volume of approximately 300 ml. The resulting mixture was combined with 150 ml. of n-hexane and cooled. The white solid D,L-α-(N - p-nitrocarbobenzoxyamino)-3-isothiazolylacetic acid was filtered off and amounted to 23.8 g. (71%), M.P. 138–139° C. (dec.); neutralization equivalent, 236 (calcd. 337).

EXAMPLE 6

Ethyl 5-isothiazolylglyoxylate

A 2.4 M solution of n-butyllithium in n-hexane (200 ml., 0.48 mole butyllithium) was added dropwise to a stirred solution of isothiazole (34.0 g., 0.40 mole) in 300 ml. of anhydrous tetrahydrofuran, maintained at approximately —65° C. The reaction was carried out in a nitrogen atmosphere. The resulting isothiazolyllithium suspension was slowly siphoned into a vigorously stirred solution of diethyl oxalate (175.2 g., 1.20 mole) in 350 ml. of anhydrous ether, cooled in a Dry Ice-acetone mixture. The addition was completed in approximately 15 minutes. The reaction mixture was allowed to warm to—40° C. and then poured into 400 ml. of 2 N hydrochloric acid. The layers were separated and the aqueous phase extracted with four 150 ml. portions of ether. The combined organic layers were dried, followed by removal of the solvent. The residue was fractionally distilled to give 52.4 g. (71%) of pale yellow liquid ethyl 5-isothiazolylglyoxylate, B.P. 105–106° C. (0.3 mm.), M.P. 19–20° C. The N.M.R. spectrum (in $CCl_4$) contains two doublets with spacings of 1.8 c.p.s. at τ 1.49 and 2.06, ascribed to the 3- and 4-isothiazole protons respectively, a methylene quartet at τ 5.60 and a methyl triplet at τ 8.57.

EXAMPLE 7

5-isothiazolylglyoxylic acid

Ethyl 5-isothiazolylglyoxylate (18.5 g., 0.10 mole) was dissolved in 75 ml. of methanol. The obtained solution was cooled in ice, followed by the addition of 40 ml. 3 N methanolic sodium hydroxide. A solid precipitated readily. After one hour at room temperature, the methanol was removed and the residue dissolved in 200 ml. of water. A small amount of insoluble material was removed. After washing with ether, the aqueous solution was acidified with 45 ml. of 3 N hydrochloric acid, then continuously extracted with ether overnight. The residue obtained after drying and removal of the ether was recrystallized from ethyl acetate to give 9.4 g. (60%) of slightly yellow colored solid 5-isothiazolylglyoxylic acid, M.P. 144–145° C. (dec.). The N.M.R. spectrum ($D_2O$) contains two doublets, at τ 1.51 and 2.17 with spacings of 2 c.p.s., ascribed to the isothiazole protons.

*Analysis.*—Calc'd for $C_5H_3NO_3S$ (neutralization equivalent, 157) (percent): C, 38.22; H, 1.93; N, 8.92. Found (percent): C, 38.31; H, 2.06; N, 9.10; (neutralization equivalent, 158).

EXAMPLE 8

Methyl α-oximino-5-isothiazolylacetate

To a solution of methyl 5-isothiazolylacetate (30.0 g., 0.191 mole) in 100 ml. of methylene chloride, cooled in ice, there was added a cold solution of nitrosyl chloride (19.6 g., 0.30 mole) in 200 ml. of methylene chloride. No immediate reaction occurred, but when the reaction mixture was allowed to warm up slightly by taking it out of the ice-bath (exposure to light), a sudden exothermic reaction took place. The reaction subsided after a few minutes, when a white precipitate of the oxime hydrochloride had formed. The mixture was cooled, the solid filtered off, and shaken with a warm mixture of water (200 ml.) and ethyl acetate (500 ml.). The ethyl acetate layer was dried and concentrated to a volume of approximately 150 ml. and then cooled. The methyl α-oximino-5-isothiazolylacetate product was collected by filtration and amounted to 33.0 g. (93%), M.P. 183–184° C. (dec.).

*Analysis.*—Calc'd for $C_6H_6N_2O_3S$ (neutralization equivalent, 186) (percent): C, 38.70; H, 3.25; N, 15.05. Found (percent): C, 39.13; H, 3.34; N, 15.20; (neutralization equivalent, 178).

EXAMPLE 9

Ethyl α-oximino-5-isothiazolylacetate (A) *From ethyl 5-isothiazolylacetate.*—From ethyl 5-isothiazolylacetate (16.4 g., 0.096 mole) and nitrosyl chloride (10 g., 0.15 mol) there was obtained 14.9 g. (78%) of the oxime by using the same procedure described in Example 8, above. The ethyl α-oximino-5-isothiazolylacetate, M.P. 147–149° C., was recrystallized from an ethyl acetate-n-hexane mixture and was found to have a neutralization equivalent of 196 (Calc'd: 200). The N.M.R. spectrum (in trifluoroacetic acid) contains two doublets at τ 1.28 and 1.53 (isothiazole protons; spacings of 3 c.p.s.), a methylene quartet at τ 5.66 and a methyl triplet at τ 8.83.

(B) *From ethyl 5-isothiazolylglyoxylate.*—A mixture of ethyl 5-isothiazolylglyoxylate (18.5 g., 0.10 mole), hydroxylamine hydrochloride (7.6 g. 0.11 mole), pyridine (8.7 g., 0.11 mole) and ethyl alcohol (90 ml.) was heated under reflux for 45 minutes. The ethanol was removed under reduced pressure and 75 ml. of water was added to the residue. The product was extracted with four 50 ml. portions of ethyl acetate. The combined ethyl acetate extracts were dried, and the solvent was removed. The residue was recrystallized from ethyl acetate-n-hexane to give 11.5 g. (58%) of white crystals of ethyl α-oximino-5-isothiazolylacetate, M.P. 147–148° C., undepressed on admixture with the material prepared as described under A.

EXAMPLE 10

Methyl α-amino-5-isothiazolylacetate hydrochloride

A mixture of methyl α-oximino-5-isothiazolylacetate 9.5 g., 0.051 mole), hydrogen chloride (2.4 g., 0.066 mole), 10% palladium on charcoal (1.0 g.), and 250 ml. of methanol was hydrogenated at 45 p.s.i. for 18 hours. The mixture was filtered and the filtrate concentrated to a volume of approximately 40 ml. Upon addition of ether, the aminoester hydrochloride precipitated. It was collected by filtration and amounted to 10.1 g. (95%). The material could be recrystallized from methanol-ether: M.P. 152–156° C. (dec.). The N.M.R. spectrum (in trifluoroacetic acid) contains broad bands at τ 0.97 and 1.87 (isothiazole protons), and sharp singlets at τ 3.73 (α–H) and 5.89 ($OCH_3$). The integrated area ratio is 1:1:1:3.

EXAMPLE 11

α-amino-5-isothiazolylacetic acid

Crude methyl α-amino-5-isothiazolylacetate hydrochloride (15.5 g., 0.0745 mole) was added to 65 ml. of 3 N aqueous sodium hydroxide. The reaction mixture was kept at room temperature for 30 minutes. After two treatments with decolorizing carbon the pH of the solution was brought to 5.0 by the addition of acetic acid. The mixture was cooled and the α-amino-5-isothiazolylacetic acid filtered off. It was redissolved in 3 N aqueous sodium hydroxide and reprecipitated by adjusting the pH to 5.0 with acetic acid. There was obtained 7.6 g. (65%) of α-amino-5-isothiazolylacetic acid M.P. 175–176° C. (d.). The N.M.R. spectrum is reported in Table III.

*Analysis.*—Calc'd for $C_5H_6N_2O_2S$ (percent): C, 37.96; H, 3.82; N, 17.71; S, 20.27. Found (percent): C, 37.91; H, 3.75; N, 18.05; S, 20.50.

EXAMPLE 12

D,L1-α-(N-p-nitrocarbobenzoxyamino)-5-isothiazolylacetic acid

To a suspension of D,L-α-amino-5-isothiazolylacetic acid (1.58 g., 0.010 mole) in 30 ml. of water was successively added 15 ml. 2 N aqueous sodium hydroxide and 10 ml. of tetrahydrofuran. The reaction mixture was cooled in an ice-salt bath and under stirring a solution of p-nitrobenzyl chloroformate (3.23 g., 0.015 mole) in 10 ml. of tetrahydrofuran was added rapidly. The mixture was cooled for an additional 10 minutes, then 50 ml. of cold water was added, followed by filtration. The filtrate was washed with two 40 ml. portions of ether, then cooled in ice, layered with 75 ml. of ethyl acetate and, under stirring, brought to pH 2.0 by the addition of 3 N aqueous sulfuric acid. The aqueous layer was extracted with two additional 75 ml. portions of ethyl acetate. The combined extracts were dried and concentrated to a volume of approximately 30 ml. After cooling, the pale yellow solid D,L-α-(N-p-nitrocarbobenzoxyamino)-5-isothiazolylacetic acid was collected by filtration. Yield, 2.35 g. (70%), M.P. 143–144° C. (dec.); neutralization equivalent, 341 (calc'd, 337).

EXAMPLE 13

Methyl 4-isothiazolylacetate

To a well stirred and refluxing solution of 4-methylisothiazole (200 g., 2.02 mole) and benzoyl peroxide 1.0 g.) in 3 liters of carbon tetrachloride there was added a mixture of N-bromosuccinimide (420 g., 2.36 mole) and benzoyl peroxide (2.0 g.) in portions over a one hour period, while the reaction flask was exposed to a 750 watt light source. When the addition was completed the reaction mixture was heated under reflux for an additional one hour whereafter it was cooled and filtered. The filtrate was concentrated under reduced pressure to a volume of approximately 700 ml. and added, over a 45-minute period, to a refluxing mixture of sodium cyanide (300 g., 6.1 mole), water (500 ml.) and methanol (3 liters). The mixture was heated under reflux for an additional one hour and was then concentrated under reduced pressure to a volume of approximately one liter. The solution, after saturation with sodium chloride, was extracted with six 1-liter portions of ethyl acetate. The combined extracts were dried and the solvent removed. The crude 4-cyanomethylisothiazole was dissolved in 2 liters of methanol and heated under reflux while a rapid stream of hydrogen chloride was passed through the solution for 1.5 hours. Next, 400 ml. of concentrated hydrochloric acid was added carefully and the heating under reflux continued for one hour. The mixture was concentrated under reduced pressure to a volume of 1.5 liters followed by the addition of 2 liters of water, saturation with sodium chloride and extraction with seven 1-liter portions of methylene chloride. The residue obtained after drying and removal of the methylene chloride was subjected to a careful fractional distillation to give 105 g. (33%) of the desired product, B.P. 75°–76° C. (0.1 mm.), identical with the material prepared from isothiazole-4-carboxylic acid by the Arndt-Eistert synthesis .[Raap, Lemieux and Micetich, U.S. Pat. 3,271,407; Raap Micetich, J. Med. Chem., 11, 70 (1968).]

EXAMPLE 14

Methyl α-bromo-4-isothiazolylacetate

A mixture of methyl 4-isothiazolylacetate (102.0 g., 0.65 mole), N-bromo-succinimide (116.0 g., 0.65 mole), benzoyl peroxide (1.0 g.) and carbon tetrachloride (2000 ml.) was heated under reflux for 1.5 hours, while exposed to a 750 watt light source. The succinimide was filtered off and the solvent removed from the filtrate, leaving 136.0 g. of slightly colored liquid residue. Without further purification this methyl α-bromo-4-isothiazolylacetate was used as described in Example 15. In a small-scale experiment the residue was distilled (with some decomposition) to give the bromo ester as a pale yellow liquid, B.P. 104–106° C. (0.5 mm.), in 77% yield. The N.M.R spectrum (in $CCl_4$) contains singlets at $\tau$ 1.20, 1.47, 4.52 and 6.21 with an integrated area ratio of 1:1:1:3 respectively.

EXAMPLE 15

α-Bromo-4-isothiazolylacetic acid

A mixture of methyl α-bromo-4-isothiazolylacetate (Example 19) (136.0 g., 0.576 mole), acetate acid (275 ml.) and 6 N hydrochloric acid (550 ml.) was allowed to stand at room temperature for 16 hours. The solvent was then removed under reduced pressure and ether (400 ml.) and water (100 ml.) were added to residue. The mixture was shaken vigorously. The aqueous layer was separated and extracted with ether (100 ml.). The ether solutions were combined and extracted with 360 ml. of cold 3 N aqueous sodium carbonate (in portions of 240 ml. and 120 ml. respectively). The carbonate extract was cooled and carefully acidified with 120 ml. of concentrated hydrochloric acid. The bromo acid was taken up in 350 ml. of ether after which the aqueous layer was extracted with two additional 250 ml. portions of ether. The combined ether solutions were dried and the ether removed. There remained a pale brown oily residue which slowly solidified. The crude α-bromo-4-isothiazolylacetic acid product (M.P. 71–90° C.; neutralization equivalent, 200) amounted to 90.9 g. (70%). It was used without further purification for the next step and in Example 16.

α-Amino-4-isothiazolylacetic acid

α-Bromo-4-isothiazolylacetic acid (90.9 g., 0.41 mole) was added to 1300 ml. of concentrated ammonium hydroxide. The solution was allowed to stand at room temperature for two days and then was concentrated to dryness under reduced pressure. Methanol (250 ml.) was added to the residue. After standing overnight the amino acid was filtered off and recrystallized from water (250 ml.) to give 39.0 g. (60%) of white crystalline α-amino-4-isothiazolylacetic acid, M.P. 193–194° C. (dec.). After another recrystallization from water, the M.P. 199–200° C. (dec.). The N.M.R. spectrum is reported in Table III. The amino acid was analyzed as its N-acetyl derivative, M.P. 177–180° C.

*Analysis.*—Calc'd for $C_7H_8N_2O_3S$ (mol. wt. 200) percent: C, 41.99; H, 4.03; N, 14.00; S, 16.01. Found (percent): C, 41.83; H, 4.22; N, 13.80; S, 16.02; neutralization equivalent, 196.

EXAMPLE 16

α-Azido-4-isothiazolylacetic acid

A mixture of α-bromo-4-isothiazolylacetic acid (56.0 g., 0.25 mole), Example 15, sodium azide (16.3 g., 0.25 mole), sodium carbonate (14.7 g., 0.14 mole) and 300 ml. of 90% aqueous acetone was stirred at room temperature for 15 hours. The solvent was then removed under reduced pressure and the residue taken up in 100 ml. of water. The solution was washed once with ether, acidified with 3 N sulfuric acid, and extracted with three 100 ml. portions of ether. The combined ether extracts were dried and treated with decolorizing charcoal. The residue obtained after removal of the ether slowly crystallized.

Yield: 45.5 g. (99%) of yellow colored solid α-azido-4-isothiazolylacetic acid, M.P. 68–74° C.; neutralization equivalent, 180 (calc'd, 184). Without any further purification this material was used for optical resolution (Example 17).

EXAMPLE 17

Optical resolution of α-azido-4-isothiazolylacetic acid

A solution of cinchonine hydrochloride was prepared by dissolving cinchonine (50.0 g., 0.17 mole) in 340 ml. of warm 0.5 N hydrochloric acid. This solution was carefully added, with scratching, to a solution of D,L-α-azido-4-isothiazolylacetic acid (46.0 g., 0.25 mole) in 500 ml. of 0.5 N aqueous sodium hydroxide. A small amount of oily impurity separated initially, followed by a white solid precipitate. The mixture was left at room temperature for 30 minutes, then the precipitate was filtered off and washed with 300 ml. of water. The azido acid was liberated from the salt and again precipitated from an aqueous solution by the addition of an equivalent amount of cinchonine hydrochloride solution in the same manner as described above. This process was repeated until the optical activity of the acid remained constant. Table IV shows the progress of this resolution.

TABLE IV

| Crystallization | 1 | 2 | 3 | 4 |
|---|---|---|---|---|
| G. of azido acid dissolved | 46.0 | 20.4 | 14.8 | 0.46 |
| G. of azido acid recovered | 20.4 | 15.9 | 12.5 | 0.19 |
| $[\alpha]_D^{25}$ of recovered azido acid, degrees | −44.9 | −54.5 | −56.3 | −55.9 |
| M.P. (° C.) of azido acid | Oil | 56–68 | 67–71 | 67–70 |

In another experiment, using the same quantities as above, the cinchonine salt that precipitated in the first crystallization was air-dried and recrystallized from methanol. For optical rotation measurements, the acid was liberated from 0.5 g. of the salt. The result of this resolution is shown in Table V.

TABLE V

| Crystallization | 1 | 2 | 3 |
|---|---|---|---|
| G. of salt dissolved | | 52.6 | 36.8 |
| G. of salt recovered | 53.2 | 37.3 | 29.2 |
| Ml. of methanol | | 700 | 550 |
| $[\alpha]_D^{25}$ recovered azido acid, degrees | −45.9 | −54.2 | −55.7 |
| M.P. (° C.) of recovered azido acid | 60–75 | 67–72 | 66–69 |

In order to obtain the dextrorotatory acid, the combined filtrate and the washings of the first crystallization were acidified with 50 ml. 6 N hydrochloric acid and continuously extracted with ether for 6 hours. The azido acid (21.7 g., 0.118 mole), having $[\alpha]_D^{25}=+42.7°$, was dissolved in 100 ml. of ethyl acetate, followed by the addition of a solution of L(−)-ephedrine (19.4 g., 0.118 mole) in 100 ml. of ethyl acetate. After cooling, the ephedrine salt was collected by filtration and recrystallized from ethyl acetate. After each recrystallization the azido acid was liberated from 0.4 g. of the salt. Table VI shows the progress of this resolution.

TABLE VI

| Crystallization | 1 | 2 | 3 |
|---|---|---|---|
| G. of salt dissolved | | 29.6 | 1.0 |
| G. of salt recovered | 30.0 | 24.2 | 0.8 |
| Ml. of ethyl acetate | 200 | 300 | 25 |
| $[\alpha]_D^{25}$ of recovered azido acid, degrees | +50.9 | +52.1 | +52.2 |
| M.P. (° C.) of salt | [1]117–118 | [1]122–123 | [1]121–122 |

[1] dec.

EXAMPLE 18

(−)-α-Azido-4-isothiazolylacetic acid

The cinchonine salt of (−)-α-azido-4-isothiazolylacetic acid (28.7 g., 0.060 mole), M.P. 176–177° C. (dec.), was suspended in 125 ml. of water and treated with 25 ml. of 6 N hydrochloric acid. The mixture was shaken till all the solid had dissolved, followed by extraction with four 150 ml. portions of ether. The combined ether extracts were dried and the solvent removed. The residue crystallized rapidly upon adding a few seed crystals. There was obtained 10.5 g. (95%) of white solid, M.P. 66–69° C. $[\alpha]_D^{25}=-55.7°$, c.=2.6 in absolute ethanol. The N.M.R. spectrum (in CDCl$_3$) consists of four singlets with the same intensity, at $\tau$ −1.86 (CO$_2$H), 1.28 and 1.42 (isothiazole protons) and 4.74 ($\alpha$-hydrogen). The infrared spectrum (Nujol mull) contained bands at 2120 and 1705 cm.$^{-1}$ ascribed to the azide and carbonyl band respectively. An analytical sample (M.P. 68–71° C., $$[\alpha]_D^{25}=-56.2°$$

c.=2.5 in absolute ethanol) was obtained by recrystallization from an ethyl acetate-n-hexane (1:3) mixture.

*Analysis.*—Calc'd for C$_5$H$_4$N$_4$O$_2$S (percent): C, 32.60; H, 219; N, 30.42. Found (percent): C, 32.79; H, 1.85; N, 30.10.

EXAMPLE 19

(+)-$\alpha$-Azido-4-isothiazolylacetic acid

The L(−)-ephedrine salt of (+)-$\alpha$-azido-4-isothiazolylacetic acid (34.9 g., 0.10 mole), M.P. 122°–123° C. (dec.), was suspended in 125 ml. of water and treated with 25 ml. of 6 N hydrochloric acid. The solution was extracted with four 150 ml. portions of ether. The combined ether extracts were dried and the solvent removed, giving 17.6 g. (95%) of white solid (+)-$\alpha$-azido-4-isothiazolylacetic acid, M.P. 65°–69° C., $[\alpha]_D^{25}=+54.3°$, c.=3.0 in absolute ethanol. The N.M.R. spectrum (in CDCl$_3$) and the infrared spectrum were identical with those of the (−)isomer. An analytical sample (M.P. 68°–71° C.: $[\alpha]_D^{25}=+56.2°$, c.=2.3 in absolute ethanol) was obtained by recrystallization from an ethyl acetate-n-hexane (1:3) mixture.

*Analysis.*—Calc'd for C$_5$H$_4$N$_4$O$_2$S (percent): C, 32.60; H, 2.19; N, 30.42. Found (percent): C, 32.75; H, 1.99; N, 30.21.

EXAMPLE 20

4-isothiazolylglyoxylic acid

To $\alpha$-azido-4-isothiazolylacetic acid (25.0 g., 0.136 mole) was added 150 ml. of 2 N aqueous sodium hydroxide, resulting in an immediate evolution of gas. The mixture was left at room temperature overnight. After acidification with 6 N hydrochloric acid it was extracted with four 150 ml. portions of ether. The combined ether extracts were dried and the ether removed leaving a yellow colored solid residue (16.4 g., 77%). The material was obtained as a white solid, M.P. 155–157° C., by recrystallization from ethyl acetate. The infrared spectrum (Nujol mull) showed bands at 1715 and 1670 cm.$^{-1}$ ascribed to the carboxyl group and keto group respectively. The N.M.R. spectrum of the potassium salt in D$_2$O consists of two sharp singlets at $\tau$ 0.44 and 1.17.

*Analysis.*—Calc'd for C$_5$H$_3$NO$_3$S (mol. wt. 157) (percent): C, 38.22; H, 1.93; N, 8.92. Found (percent). C, 38.49; H, 2.04; N, 9.19; neutralization equivalent, 154.

EXAMPLE 21

(−)-$\alpha$-Amino-4-isothiazolylacetic acid

A mixture containing (−)-$\alpha$-azido-4-isothiazolylacetic acid (9.2 g., 0.050 mole), 10% palladium on charcoal (3.5 g.), methanol (150 ml.) and 0.5 N hydrochloric acid (100 ml.) was hydrogenated at 50 lbs. pressure for 12 hours, followed by filtration. The combined filtrates of two batches were concentrated under reduced pressure to a volume of approximately 50 ml. This concentrate was extracted with two 25 ml. portions of ether. From the ether extract 2.4 g. of starting material was recovered. The aqueous solution was cooled in ice and brought to pH 5.0 by the addition of concentrated ammonium hydroxide. The white solid (−)-$\alpha$-amino-4-isothiazolylacetic acid (10.0 g.) was filtered off and dried in vacuo over P$_2$O$_5$. An additional crop (1.5 g.) was obtained when the filtrate was concentrated. Yield, 11.5 g. (84%, based on unrecovered starting material), M.P. 172–173° C. (dec.); $[\alpha]_D^{25}=-76.15°$ (c.=2.2 in water). After recrystallization from water: M.P. 180–181° C. (dec.); $[\alpha]_D^{25}=-76.3°$ (c.=1.5 in water).

EXAMPLE 22

(+)-$\alpha$-Amino-4-isothiazolylacetic acid (A) *By reduction of (+)-$\alpha$-azido-4-isothiazolylacetic acid.*—A mixture containing (+)-$\alpha$-azido-4-isothiazolylacetic acid (9.2 g., 0.050 mole), 10% palladium on charcoal (2.0 g.), methanol (150 ml.), and 0.5 N hydrochloric acid (100 ml.) was hydrogenated at 50 lbs. for 16 hours, followed by filtration. The filtrate was concentrated to a volume of approximately 30 ml., and then extracted with two 20 ml. portions of ether. One and four-tenths grams of starting material was recovered from the ether extract. The aqueous solution was brought to pH 5.0 with dilute ammonium hydroxide and cooled. Slightly yellow colored crystals of (+)-$\alpha$-amino-4-isothiazolylacetic acid were obtained, filtered off, and dried in vacuo over P$_2$O$_5$. An additional 0.5 g. of product was obtained by concentrating the filtrate. Yield, 4.6 g. (70%, based on unrecovered starting material, M.P. 169–170° C. (dec.);

$$[\alpha]_D^{25}=+75.0°$$

(c.=1.9 in water)). After recrystallization from water: M.P. 181–182° C. (dec.); $[\alpha]_D^{25}=+76.4°$ (c.=1.3 in water).

(B) *By resolution of D,L-$\alpha$-amino-4-isothiazolylacetic acid.*—A mixture of D,L-$\alpha$-amino-4-isothiazolylacetic acid (20.0 g., 0.126 mole) and $d$-camphora - 10 - sulfonic acid (29.4 g., 0.126 mole) was dissolved in a minimum amount of boiling isobutyl alcohol. The solution was cooled for three days in a refrigerator. The fluffy precipitate was then filtered off and washed with cold isobutyl alcohol (approximately half the volume required to dissolve the salt). The salt was recrystallized from isobutyl alcohol till no further increase in optical rotation was observed. The progress of the resolution is shown in Table VII.

TABLE VII

| Crystallization | 1 | 2 | 3 | 4 |
|---|---|---|---|---|
| G. of salt dissolved | | 21.6 | 9.6 | 5.3 |
| G. of salt recovered | 21.6 | 9.6 | 5.3 | 3.6 |
| Ml. of isobutyl alcohol | 175 | 265 | 160 | 90 |
| $[\alpha]_D^{25}$ of salt in water, degrees | +34.8 | +45.4 | +47.0 | +46.0 |

The optically pure $d$-camphor-10-sulfonic acid salt (4.9 g., 0.00129 mole), M.P. 166–167° C. (dec.), was dissolved in 15 ml. of water. The pH of the solution was brought to 5.0 by the addition of 3 N aqueous sodium hydroxide. After cooling, the white crystals of (+)-$\alpha$-amino-4-isothiazolylacetic acid (1.0 g.) were filtered off and dried in vacuo over P$_2$O$_5$: M.P. 177–178° C. (dec.); $[\alpha]_D^{25}=+75.3°$, c.=2.2 in water. An additional 0.45 g. of (+)-$\alpha$-amino-4-isothiazolylacetic acid product was obtained when the filtrate was concentrated. After recrystallization from water: M.P. 181–182° C. (dec.); $[\alpha]_D^{25}=+76.3°$, c.=1.2 in water. The infrared spectrum was identical with the material obtained by reduction of the (+)-azido acid.

EXAMPLE 23

(−)-$\alpha$-(N-p-nitrocarbobenzoxyamino)-4-isothiazolylacetic acid

To a cold suspension of (−)-$\alpha$-amino-4-isothiazolylacetic acid (12.0 g., 0.076 mole) in 200 ml. of water there was added 76 ml. of 1 N aqueous sodium hydroxide, followed by 200 ml. of tetrahydrofuran. While the mixture was cooled in ice, a solution of p-nitrobenzyl chloroformate (21.6 g., 0.11 mole) in 200 ml. of tetrahydrofuran was added thereto dropwise with stirring, while by simultaneous addition of 1 N aqueous sodium hydroxide, the pH of the reaction mixture was maintained at 8.0–8.5. When the addition was completed (in approximately 20 minutes), the mixture was cooled for an additional 5 minutes, followed by a rapid washing with two 100 ml. portions of ether. The aqueous solution was layered with 200 ml. of ethyl acetate and with stirring and cooling, brought to pH 2.1 by the addition of 3 N hydrochloric acid. The aqueous layer was extracted with two additional 200 ml. portions of ethyl acetate. The combined ethyl acetate extracts were dried and the solvent removed to give 20.0 g. (78%) of white solid (−)-α-(N-p-nitrocarbobenzoxyamino) - 4 - isothiazolylacetic acid, M.P. 152–155° C. $[\alpha]_D^{25}=-56.5°$, c.=2.7 in absolute ethanol. After recrystallization from an ethyl acetate-n-hexane (1:1) mixtures: M.P. 159–160° C., $[\alpha]_D^{25}=-58.5°$, c.=2.8 in absolute ethanol.

*Analysis.*—Calc'd for $C_{13}H_{11}N_3O_6S$ (mol. wt. 337) (percent): C, 46.29; H, 3.29; N, 12.46. Found (percent): C, 46.47; H, 3.50; N, 12.19; neutralization equivalent, 321.

EXAMPLE 24

(+)-α-(N-p-nitrocarbobenzoxyamino)-4-isothiazolylacetic acid

To a cold suspension of (+)-α-amino-4-isothiazolylacetic acid (3.16 g., 0.020 mole) in 60 ml. of water there was added 20 ml. of 1 N aqueous sodium hydroxide, followed by 60 ml. of tetrahydrofuran. While the mixture was cooled in ice, a solution of p-nitrobenzyl chloroformate (6.48 g., 0.030 mole) in 60 ml. of tetrahydrofuran was added thereto dropwise with stirring while, by the simultaneous addition of 1 N aqueous sodium hydroxide, the pH was maintained at 8.0–8.5. When the addition was completed (in approximately 20 minutes), the mixture was cooled for an additional 5 minutes and then rapidly washed with two 60 ml. portions of ether. The aqueous solution was layered with 100 ml. of ethyl acetate and, with stirring and cooling, brought to pH 2.1 by the addition of 3 N hydrochloric acid. The aqueous layer was extracted with two additional 100 ml. portions of ethyl acetate. The combined ethyl acetate extracts were dried and the solvent removed to give 6.7 g. (100%) of white solid residue of (+)-α-(N - p - nitrocarbobenzoxyamino)-4-isothiazolylacetic acid, M.P. 154–155° C. After recrystallization from an ethyl acetate - n - hexane (1:1) mixture: M.P. 158–159° C.; $[\alpha]_D^{25}=+58.0°$; c.=2.7 in absolute ethanol.

EXAMPLE 25

6-[D,L-α-amino-4-isothiazolylacetamido] penicillanic acid

N,N' - dicyclohexylcarbodiimide (10.8 g., 0.0535 mole) was added under stirring to a solution of (−)-α-(N-p-nitrocarbobenzoxyamino)-4-isothiazolylacetic acid (18.0 g., 0.0535 mole) and 2,4-dinitrophenol (9.8 g., 0.0535 mole) in 125 ml. of cold anhydrous dioxane. The mixture was allowed to come to room temperature in one hour, then the N,N'-dicyclohexylurea (10.6 g., 90%) was filtered off and washed with 75 ml. of ethyl acetate. The combined filtrate and washings were concentrated under reduced pressure to a syrup. A cold solution of 6-aminopenicillanic acid (10.8 g., 0.0050 mole) and triethylamine (10.6 g., 0.105 mole) in 125 ml. of methylene chloride was added to the crude activated ester, cooled in ice. The reaction mixture was slowly allowed to warm up to room temperature and left at this temperature for 16 hours. A small amount of insoluble material was filtered off, whereafter the triethylamine salt of the 6-[D,L-α-(N - p - nitrocarbobenzoxyamino) - 4 - isothiazolylacetamido]penicillanate was precipitated by the addition of ether. The triethylamine salt was twice redissolved in methylene chloride (40 ml.) and reprecipitated with ether (200 ml.). The material, which crystallized in the final precipitation, was dissolved in methanol (50 ml.), followed by the addition of a 2.4 M solution of potassium 2-ethylhexanoate in n-butyl alcohol (25 ml.). The protected potassium penicillanate precipitated as a yellow solid upon the addition of ether. It was twice redissolved in methanol (50 ml.) and reprecipitated with ether (200 ml.) and finally kept in vacuo over $P_2O_5$ for a few hours. The product amounted to 25.8 g. (90%, based on 6-APA). The protected penicillin was approximately 90% pure, as was concluded after examination of the thin-layer chromatogram, infrared absorption spectrum and nuclear magnetic resonance spectrum.

Material prepared in the same manner from the (+)-protected amino acid had the same optical rotation ($[\alpha]_D^{25}=+140$, c.=1.3 in water) and was also identical in very other respect, indicating that complete racemization had taken place.

The protecting group was removed as follows. A mixture of the protected potassium penicillanate (25.5 g.), 10% palladium on charcoal (3.0 g.) and 250 ml. of water was hydrogenated at 30 lbs. pressure for two hours. The resulting mixture was filtered through celite and the filter washed with 300 ml. of water. The combined filtrate and washings were adjusted to pH 4.7 with 3 N hydrochloric acid, and the solution was concentrated to dryness under reduced pressure at approximately 25° C. The material started to crystallize from a very concentrated solution. The yellow colored solid residue (13.7 g.) was powdered and treated with 25 ml. of cold water followed by filtration. The solid was washed on the filter with two additional 10 ml. portions of cold water and finally dried in vacuo over $P_2O_5$. Yield: 6.0 g. (38%) of pale yellow colored 6-[D,L-α-amino - 4 - isothiazolylacetamido]penicillanic acid. The infrared spectrum (Nujol mull) contained a sharp N–H band at 3260 cm.$^{-1}$, and strong carbonyl bands at 1765 and 1665 cm.$^{-1}$, ascribed to the β-lactam and amide carbonyl respectively. The penicillin was chemically pure as indicated by thin-layer chromatography and N.M.R. spectroscopy. The N.M.R. spectrum clearly indicated that a 50/50 mixture of the D- and L-epimers was obtained. The same mixture was obtained by hydrogenation of the protected penicillin obtained from the (+)-protected amino acid. $[\alpha]_D^{25}=+218°$, c.=1.2 in water.

This compound, 6-[D,L-α-amino - 4 - isothiazolylacetamido] penicillanic acid possesses in vitro activity as demonstrated by the following M.I.C. data:

| Organism: | M.I.C. |
|---|---|
| Str. pyogenes | 0.062 |
| S. aureus Smith | 0.125 |
| E. coli Juhl | 12.5 |
| Sal. typhosa | 1.6 |
| K. pneumoniae | 1.6 |

EXAMPLE 26

6-[D-(−)-α-amino-4-isothiazolylacetamido] penicillanic acid

N,N'-dicyclohexylcarbodiimide (6.35 g., 0.0308 mole) was added under stirring to a solution of (−)-α-(N-p-nitrocarbobenzoxyamino)-4-isothiazolylacetic acid (10.4 g., 0.0308 mole) and 2,4-dinitrophenol (5.7 g., 0.0308 mole) in 100 ml. of anhydrous tetrahydrofuran, cooled in ice. The reaction mixture was kept at 0° C. for one hour, then the N,N'-dicyclohexylurea was filtered off and the solvent removed from the filtrate under reduced pressure. The crude activated ester was used immediately without further purification. It could, however, be crystallized as a white solid from methylene chloride: M.P. 92°–93° C. (dec.); $[\alpha]_D^{25}=-18.5°$, c.=3.3 in dioxane.

Triethylammonium 6-aminopenicillanate was prepared by concentrating a solution of 6-aminopenicillanic acid (6.05 g., 0.028 mole) and triethylamine (6.1 g., 0.060 mole) in 60 ml. of methylene chloride to dryness under reduced pressure. The white solid residue was powdered and kept in vacuo for two hours. It was then used for the reaction with the activated ester. A solution of triethylammonium 6 - aminopenicillanate in 60 ml. of methylene chloride was added dropwise under stirring to a suspension of the activated ester in 75 ml. of methylene chloride, cooled in ice. Stirring and cooling were continued for an additional 15 minutes, then the ice-bath was removed and the solution was allowed to come to room temperature in two hours. An additional amount of triethylamine (3.02 g., 0.030 mole) was then added with stirring and cooling in ice. A small amount of insoluble material was filtered off through Celite and the filtrate was concentrated to a volume of approximately 80 ml. The triethylammonium-6[α-(N-p - nitrocarbobenzoxyamino)-4-isothiazolylacetamido]penicillanate was precipitated by the addition of ether and twice redissolved in methylene chloride (50 ml.) and reprecipitated with ether (300 ml.). The material, which crystallized in the final precipitation, was dissolved in methanol (40 ml.), followed by the addition of a 2.4 M solution of potassium 2-ethylhexanoate in n-butyl alcohol (12 ml.). The potassium 6-[D(—)-α-(N - p - nitrocarbobenzoxyamino) - 4 - isothiazolylacetamido]penicillanic acid was precipitated by the addition of ether. It was twice redissolved in methanol (50 ml.) and reprecipitated with ether (300 ml.) to give 12.3 g. (77%, based on 6–APA) of yellow colored protected penicillin. On basis of thin-layer chromatogram, infrared and N.M.R. spectra, the purity was estimated at about 90%.

A mixture of the nitrocarbobenzoxy protected potassium-6-[D - (—)-α-amino-4-isothiazolylacetamido]penicillanate (12.3 g.), 10% palladium on charcoal (2.0 g.) and water (125 ml.) was hydrogenated at 20 lbs. pressure for two hours. The mixture was filtered through Celite, the filtrate cooled in ice and the pH brought to 2.5 by the addition of 3 N hydrochloric acid. Some precipitated impurities were filtered off (celite) and the clear and almost colorless filtrate brought to pH 4.5 with 3 N aqueous sodium hydroxide. The solution was concentrated to dryness under reduced pressure (at approximately 25° C). and the solid residue dried in vacuo. For purification, the material (7.1 g.) was finely powdered and treated with 100 ml. of methanol. The insoluble material was treated with two additional 50 ml. portions of methanol. There remained 0.51 g. of an insoluble solid material, inorganic in nature according to infrared spectroscopy. The combined methanolic solutions were cooled, and 200 ml. of methylene chloride were added. The mixture was cooled for 20 minutes in an ice-bath, followed by filtration to give 2.5 g. of almost white solid. The filtrate was treated with 200 ml. of ether and cooled overnight in a refrigerator. An additional 2.0 g. of material precipitated. This second crop was successively treated with 8 ml. and 5 ml. portions of cold methanol and the insoluble product (1.0 g.) was added to the first crop. The combined material (3.5 g.) was treated with 10 ml. of cold methanol followed by washing with two additional 5 ml. portions of cold methanol. The methanol-insoluble penicillin (2.8 g.) was finally dissolved in 30 ml. of water and the solution was freeze-dried to give 2.5 g. of pale yellow colored 6-[D-(—)-α-amino-4-isothiazolylacetamido]penicillanic acid;

$$[\alpha]_D^{25} = +213.5°$$

c.=1.0 in water. The purity was about 85–90% as indicated by thin-layer chromatogram and by infrared and N.M.R. spectroscopy. The N.M.R. spectrum is reported in Table I.

This compound exhibited in vitro activity as shown by the M.I.C. data given below:

| Organism: | M.I.C. |
|---|---|
| Str. pyogenes | .016 |
| S. aureus Smith | .125 |
| Penicillin G—resistant-Staph. | 25 |
| E. coli Juhl | 6.2 |
| Sal. enteritidis | .4 |
| Sal. typhosa | .8 |
| K. pneumoniae | .8 |

The compound also exhibited activity when administered orally to mice as shown by a $CD_{50}$, in mg./kg. of about 60 against E. coli, about 0.8 against Staph. aureus Smith, and about 80 against K. pneumoniae.

EXAMPLE 27

6-[L-(+)-α-amino-4-isothiazolylacetamido] penicillanic acid

This penicillin was prepared, starting from (+)-α-(N-p-nitrocarbobenzoxyamino) - 4 - isothiazolylacetic acid, using the same procedure and the same quantities as for the (—)-epimer, Example 26. The intermediate 2-4-dinitrophenyl ester melted at 91–92° C. with decomposition and had a specific rotation $[\alpha]_D^{25} = +18.4°$, c.=3.9 in dioxane. The yield of protected penicillin amounted to 11.1 g. (69%), again with a purity of approximately 90%. The catalytic reduction yielded 5.7 g. of crude 6-[L-(+)-α-amino - 4 - isothiazolylacetamido]penicillanic acid. This material was more soluble in methanol than the (—)-epimer and was purified by dissolving it in 75 ml. of methanol (0.7 g. of inorganic salt was filtered off), followed by treatment with 75 ml. of ether. The precipitated material was filtered off and dissolved in 40 ml. of water. Freeze-drying of the aqueous solution yielded 3.0 g. of pale yellow colored 6-[L-(+)-α-amino-4-isothiazoylacetamido]penicillanic acid with a purity of 85–90% as indicated by the thin-layer chromatogram and by infrared and N.M.R. spectroscopy. $[\alpha]_D^{25} = +184.3°$, c.=1.0 in water. The N.M.R. spectrum is reported in Table I.

The in vitro antimicrobial activity of this compound is demonstrated by the following M.I.C. data:

| Organism: | M.I.C. |
|---|---|
| Str. pyagenes | 0.031 |
| Staph. aureus Smith | 0.25 |
| E. coli Juhl | 12.5 |
| Sal. enteritidis | 1.6 |
| Sal. typhosa | 3.1 |
| K. pneumoniae | 6.2 |

EXAMPLE 28

6-[D,L-α-amino-3-isothiazolylacetamido]penicillanic acid

N,N'-dicyclohexylcarbodiimide (12.8 g., 0.062 mole) was added to a cold solution of α-(N-p-nitrocarbobenzoxyamino)-3-isothiazolylacetic acid (20.9 g., 0.062 mole) and 2,4-dinitrophenol (11.4 g., 0.062 mole) in 150 ml. of anhydrous dioxane. The reaction mixture was left at room temperature for three hours. The N,N'-dicyclohexylurea (13.9 g., 100%) was filtered off, and washed with 60 ml. of ethyl acetate. The combined filtrate and washings were concentrated to a thick oil under reduced pressure. The oil was kept in vacuo for two hours, then it was cooled in ice and an ice-cold solution of 6-aminopenicillanic acid (13.0 g., 0.060 mole) and triethylamine (12.6 g., 0.123 mole) in 125 ml. of methylene chloride was added thereto. The reaction mixture was cooled in ice for one hour, then left at room temperature for 16 hours. A small amount of insoluble material was filtered off, and the triethylammonium-6-[D,L-α-(N-p-nitrocarbobenzoxyamino)-3-isothiazolylacetamido]penicillanate was precipitated as an oil by the addition of ether (400 ml.). It was twice redissolved in methylene chloride and reprecipitated with ether. Next, the material was dissolved in methanol (70 ml.) and a 2.4 M solution of potassium 2-ethylhexanoate in n-butyl alcohol (30 ml.) was added. The potassium-6-[D,L-α-(N-p-nitrocarbobenzoxyamino)-3-isothiazolylacetamido]penicillanate was precipitated as a wax by the addition of ether (400 ml.). It was twice redissolved in methanol (100 ml.) and reprecipitated with ether (400 ml.). Crystallization of the wax was induced by extensive rubbing with a glass rod. The yellow colored solid was filtered off and dried in vacuo over $P_2O_5$. Yield, 28.3 g. (85%) of protected penicillin with a purity of approximately 85% as indicated by thin-layer chromatogram and by infrared and n.m.r. spectroscopy.

The material was catalytically reduced in small batches as follows: A mixture of the potassium salt of the protected penicillin (3.2 g., 0.0056 mole), 10% palladium on charcoal (1.0 g.) and water (45 ml.) was hydrogenated at atmospheric pressure for six hours. A total amount of approximately 420 ml. $H_2$ (25° C., 700 mm. Hg) was absorbed. The mixture was filtered through Celite and the filtrate washed with two 25 ml. portions of ether. The aqueous solution (pH 7.7) was brought to pH 4.5 by the addition of 1 N hydrochloric acid, then again washed with ether and filtered through Celite. Freeze drying of the aqueous solution yielded 1.7 g. (86%) of 6-[D,L-α-amino-3-isothiazolylacetamido]penicillanic acid. Taking the presence of some potassium chloride into account, the purity at this stage was estimated at 70%. A total amount of 13.0 g. of this material was dissolved in 40 ml. of water and cooled for three days in a refrigerator. The precipitated pale brown solid (1.1 g.) was filtered off, washed with 40 ml. of ice-water and again recrystallized from water (20 ml.) to give 0.24 g. of pale brown crystalline material; $[\alpha]_D^{25} = +258°$ C.=1 in water with 1 mole equivalent of potassium carbonate. The infrared spectrum contained strong bands at 1775 and 1695 cm.$^{-1}$, ascribed to the β-lactam and amide carbonyl respectively. From the n.m.r. spectra of the crude and recrystallized material, it was clear that the *geminal* dimethyl group appears as one singlet in one epimer and as two singlets in the other epimer, as is the case with the 6-[α-amino-4-isothiazolylacetamido]penicillanic acids (Table I). The final recrystallized material consisted of over 70% of the latter epimer. This epimer is believed to have the D configuration for the isothiazolylacetamido group, as its antibacterial activity is approximately three times better than that of the D,L mixture.

This compound, i.e., 6-[D,L-α-amino-3-isothiazolylacetamido]penicillanic acid, exhibited in vitro antimicrobial activity as shown by the following M.I.C. data obtained by serial tube dilution.

| Organism: | M.I.C. |
|---|---|
| Str. pyogenes | 0.062 |
| S. aureus Smith | 0.25 |
| E. coli | 25.00 |
| Sal. enteritidis | 0.8 |
| Sal. typhosa | 3.1 |
| K. pneumoniae | 6.2 |

EXAMPLE 29

6-[D,L-α-amino-5-isothiazolylacetamido]penicillanic acid

N,N'-dicyclohexylcarbodiimide (1.03 g., 0.0050 mole) was added under stirring, to a solution of α-(N-p-nitrocarbobenzoxyamino)-5-isothiazolylacetic acid (1.69 g., 0.0050 mole) and 2,4-dinitrophenol (0.92 g., 0.0050 mole) in 20 ml. of anhydrous tetrahydrofuran at a temperature of about −30° C. The reaction mixture was stirred and cooled at −30 to −20° C. for two hours. The N,N'-dicyclohexylurea (0.9 g., 82%) was filtered off and the solvent removed from the filtrate under reduced pressure. To the red colored residue there was added a solution of 6-amino-penicillanic acid (0.97 g., 0.0045 mole) and triethylamine (0.91 g., 0.0090 mole) in 20 ml. of methylene chloride. As the darkly colored reaction mixture became solid an additional 10 ml. of methylene chloride was added, and the mixture was left at room temperature for 20 hours. The mixture was then filtered through Celite, and the triethylammonium-6-[D,L-α-(N-p-nitrocarbobenzoxyamino) - 5 - isothiazolylacetamido]penicillanate was precipitated by the addition of ether. The triethylammonium penicillanate was redissolved in methylene chloride and reprecipitated with ether three times. In one of the reprecipitations only a small amount of ether was added initially, followed by filtration and addition of more ether to the filtrate. Most of the intensely red colored impurity could thus be filtered off before the bulk of the product precipitated. Upon rubbing with a glass rod the oil crystallized and was filtered and dried in vacuo. The yellow colored solid (1.8 g.) was dissolved in the minimum amount of methanol and a 2.4 M solution of potassium 2-ethylhexanoate in n-butyl alcohol (2.0 ml.) was added. The potassium-6-[D,L-α-(N-p-nitrocarbobenzoxyamino) - 5 - isothiazolylacetamido]penicillanate was precipitated by the addition of ether and three times redissolved in methanol and reprecipitated with ether. There was obtained 1.1 g. (43%) of yellow colored protected penicillin with a purity of approximately 75%.

A mixture of the protected potassium penicillanic acid salt (1.05 g., 0.0018 mole), 10% palladium on charcoal (0.50 g.) and 20 ml. of water was hydrogenated at atmospheric pressure for 1¾ hours. A total amount of 147 ml. of hydrogen (25° C., 700 mm. Hg) were taken up during this period. The mixture was filtered through Celite, the filtrate washed once with ether, and then acidified to pH 4.0 with 1 N hydrochloric acid. The resulting solution was washed once more with ether and then freeze-dried. There was obtained 0.58 g. of 6-[D,L-α-amino-5-isothiazolylacetamido]penicillanic acid.

A mixture of the D and L forms of the potassium salt of 6-[α-amino-5-isothiazolylacetamido]penicillanic acid showed in vitro antimicrobial activity as shown by the following M.I.C. data obtained by serial tube dilution.

| Organism: | M.I.C. |
|---|---|
| Str. pyogenes | 0.062 |
| S. aureus Smith | 0.25 |
| Sal. enteritidis | 1.6 |
| Sal. typhosa | 6.2 |

EXAMPLE 30

7-[D-(−)-α-amino-4-isothiazolylacetamido] cephalosporanic acid.

N,N'-dicyclohexylcarbodiimide (2.06 g., 0.010 mole) was added with stirring to a solution of (−)-α-(N p-nitrocarbobenzoxylamino)-4-isothiazolylacetic acid (3.37 g., 0.010 mole) and 2,4-dinitrophenol (1.84 g., 0.010 mole) in 30 ml. of anhydrous tetrahydrofuran, cooled in ice. The reaction mixture was kept at 0° C. for one hour, then the N,N'-dicyclohexylurea was filtered off and the solvent was removed from the filtrate under reduced pressure. Triethylammonium 7-aminocephalosporanate was prepared by concentrating a solution of 7-aminocephalosporanic acid (2.72 g., 0.010 mole) and triethylamine (2.02 g., 0.020 mole) in 20 ml. of methylene chloride to dryness under reduced pressure. The residue foam was kept in vacuo for one hour, then dissolved in 15 ml. of methylene chloride and added dropwise in 10 minutes to a stirred solution of the crude activated ester in 15 ml. of methylene chloride, cooled in ice. The mixture was cooled in ice for an additional 15 minutes and then allowed to warm to room temperature in two hours. An additional amount of triethylamine (1.01 g., 0.010 mole) was then added thereto with stirring and cooling in ice. A small amount of impurity was removed by filtration through Celite and the triethylammonium 7-[D(−)-α-(N-p-nitrocarbobenzoxyamino) - 4 - isothiazolylacetamido]cephalosporanate precipitated from the filtrate by the addition of ether. It was twice redissolved in methylene chloride and reprecipitated with ether. The salt, which crystallized in the final precipitation, was taken up in 35 ml. of methanol. The solution was decanted from a small amount of insoluble sticky material, followed by the addition of a 2.4 M potassium 2-ethylhexanoate in n-butyl alcohol solution (4 ml.). The potassium 7-[D(−)-α-(N-p-nitrocarbobenzoxyamino) - 4 - isothiazolylacetamido]cephalosporanate was precipitated by the addition of ether (100 ml.) It was then suspended in 50 ml. of methanol and treated with 150 ml. of ether, followed by filtration and drying. There was obtained 2.4 g. (38%) of the cephalosporin with a purity of approximately 80% as indicated by thin-layer chromatography and infrared and NMR spectroscopy.

A mixture of the protected cephalosporin (2.3 g., 0.0037 mole), 10% palladium on charcoal (1.0 g.) and 25 ml. of water was hydrogenated at atmospheric pressure for one hour. A total amount of 190 ml. of hydrogen was taken up (25° C., 700 mm. Hg). The mixture was filtered through Celite, the filtrate (pH 7.4) cooled in ice and brought to pH 2.5 with 3 N hydrochloric acid. Some precipitate was removed by a filtration through Celite, whereafter the clear and almost colorless filtrate was brought to pH 4.7 with 3 N aqueous sodium hydroxide. The solution was concentrated to dryness under reduced pressure (at approximately 25° C.) and the solid residue dried in vacuo. There was obtained 0.95 g. of solid 7 - [D - (—)-α-amino - 4 - isothiazolylacetamido] cephalosporanic acid; $[\alpha]_D^{25}=+77.1°$, c.=1.1 in water. The purity was estimated at 65%, by thin-layer chromatography and infrared in NMR spectroscopy.

This material was characterized by an M.I.C. of about 0.5 mcg./ml. against *Str. pyogenes*, and about 50 mcg./ml. against *E. coli* Juhl, *Sal. enteritidis*, *Sal. typhosa*, and *K. pneumoniae*, as determined by serial tube dilution.

EXAMPLE 31

7-[L-(+)-α-amino-4-isothiazolylacetamido] cephalosporanic acid.

This cephalosporin was prepared, starting from (+)-α-(N-p-nitrocarbobenzoxyamino) - 4 - isothiazolylacetic acid, using the same procedure and the same quantities as for the (—)-epimer, Example 30. The yield of protected cephalosporin amounted to 4.0 g. (64%), again with a purity of approximately 80%. The catalytic hydrogenation of a mixture of the protected cephalosporin (3.9 g.), 10% palladium on charcoal (1.5 g.) and water (35 ml.) yielded 1.35 g. of pale brown colored 7-[L-(+)-αamino - 4 - isothiazolylacetamido]cephalosporanic acid; $[\alpha]_D^{25}=+69.1$, c.=1.1 in water. The purity was estimated at 65% on basis of the thin-layer chromatogram and infrared and NMR spectrum.

This material was characterized by an M.I.C. of about 1.0 mcg./ml. against *Str. pyogenes*, about 100 mcg./ml. against *E. coli* Juhl, and about 50 mcg./ml. against *Sal. enteritidis*, *Sal. typhosa*, and *K. pneumoniae*.

EXAMPLE 32

6-[D-(—)-α-amino-4-isothiazolylacetamido]-penicillanic acid (—)-α-(N-p-nitrocarbobenzoxyamino) - 4 - isothiazolylacetic acid was prepared in quantitative yield from (—)-α-amino - 4 - isothiazolylacetic acid (21.0 g. 0.133 mole) and p-nitrobenzyl chloroformate (35.7 g., 0.166 mole) by the procedure outlined above. From this material, potassium 6 - [(—) - α - (N-p-nitrocarbobenzoxyamino) - 4 - isothiazolylacetamido]penicillanate was prepared as follows.

N,N'-dicyclohexylcarbodiimide (13.2 g., 0.064 mole) was added under stirring to a solution of (—)-α-N-p-nitrocarbobenzoxyamino - 4 - isothiazolylacetic acid (21.6 g., 0.064 mole) and 2,4-dinitrophenol (11.8 g., 0.064 mole) in 200 ml. of anhydrous tetrahydrofuran, cooled in ice. The reaction mixture was stirred at 0° C. for one hour, then the N,N'-dicyclohexylurea was filtered off and the solvent removed from the filtrate under reduced pressure. The residue was dissolved in 150 ml. of methylene chloride. The activated ester crystallized from solution upon cooling.

Triethylammonium 6-aminopenicillanate was prepared by concentrating a solution of 6-aminopenicillanic acid (13.3 g., 0.0615 mole) and triethylamine (12.4 g., 0.123 mole) in 125 ml. of methylene chloride to dryness. It was dissolved in 125 ml. of methylene chloride and added dropwise in 20 minutes to a stirred suspension of the activated ester in methylene chloride (150 ml.), cooled in ice. After the addition was completed, the mixture was kept in the ice-bath for an additional 15 minutes, then was allowed to come to room temperature in two hours. An additional amount of triethylamine (6.4 g., 0.064 mole was added with stirring and cooling in ice. A small amount of insoluble material was filtered off and the filtrate concentrated under reduced pressure to a volume of approximately 150 ml. The triethylammonium-6-[(—)-α-(N-p-nitrocarbobenzoxyamino) - 4 - isothiazolylacetamido]penicillanate was precipitated by the addition of ether and twice redissolved in methylene chloride (80 ml.) and reprecipitated with ether (400 ml.). The material, which crystallized in the final precipitation, was taken up in 70 ml. of methanol and treated with 26 ml. of a 2.4 M solution of potassium 2-ethylhexanoate in n-butyl alcohol. The potassium-6-[(—)-α-(N-p-nitrocarbobenzoxyamino) - 4 - isothiazolylacetamido]penicillanate was precipitated by the addition of ether and twice redissolved in methanol (80 ml.) and reprecipitated with ether (500 ml.). Yield, 30.0 g. (85%) of yellow colored solid.

The experiment was repeated on the same scale to give an additional 30.0 g. of the protected penicillin.

The removal of the protecting group was carried out in four 15 g. batches as follows. A mixture of the protected penicillin (15.0 g., 0.0262 mole), 10% palladium on charcoal (2.5 g.) and water (150 ml.) was hydrogenated at 20 lbs. pressure for one hour. The mixture was filtered through Celite, the filtrate cooled in ice and brought to pH 2.5 with 3 N hydrochloric acid. The mixture was filtered again through Celite, and the clear pale-yellow colored filtrate brought to pH 4.5 and 3 N aqueous sodium hydroxide. The solution was concentrated to dryness under reduced pressure (at approximately 25° C.) and the solid residue dried in vacuo, to give 9.5 g. of crude 6-[D-(—)-α-amino - 4 - isothiazolylacetamido]-penicillanic acid. The combined material from four batches (37.3 g.) was treated with 200 ml. of methanol. The insoluble material was treated with three additional 200 ml. portions of methanol. There remained 5.0 g. of insoluble solid, almost exclusively inorganic in nature. The combined methanolic solutions were treated with 1 liter of ether, then cooled in ice for one hour. The precipitated solid (21.7 g.) was filtered off and successively treated with one 40 ml. portion and two 15 ml. portions of cold methanol. The methanol insoluble product (15.5 g.) was dissolved in 100 ml. of water and the solution freeze-dried to give 14.6 g. of pale yellow colored 6-[D-(—)-α-amino-4-isothiazolylacetamido] - penicillanic acid; $[\alpha]_D^{25}=+215°$, c.=1.4 in water. The ash value was less than 2%. The penicillin had a purity of about 85% as indicated by thin-layer chromatography and infrared and NMR spectra. The NMR spectrum is reported in Table III.

The compound prepared above exhibited in vitro antimicrobial activity demonstrated by the M.I.C. data, obtained by serial tube dilution, given below.

| Organism: | M.I.C. |
|---|---|
| *Str. pyogenes* | .008 |
| Staph. *aureus* Smith | .125 |
| Penicillin-resistant *Staph. aureus* | 50.000 |
| *E. coli* Juhl | 3.1 |
| *Sal. enteritidis* | .5 |
| *Sal. typhosa* | .8 |
| *K. pneumoniae* | .8 |

Compounds of the present invention include decephalosporanic acid derivatives of 7 - aminocephalosporanic acid. Accordingly, the term "7 - aminocephalosporanic acid nucleus," as used herein, includes the decephalosporanic acid derivatives thereof. Enzymatic hydrolysis of the acetoxy group of 7-aminocephalosporanic acid provides 3 - hydroxymethyl-7-aminodecephalosporanic acid which may be re-esterified with benzoic acid or a lower alkanoic acid such as acetic acid, propionic acid, butanoic acid, and the like. Preferably the re-esterification reaction is carried out on an isothiazolylacetamido decephalosporanic acid obtained by hydrolysis of the corresponding cephalosporanic acid.

EXAMPLE 33

When each of the following chlorides propionyl chloride
butanoyl chloride
pentanoyl chloride and
benzoyl chloride is added to 3-hydroxymethyl-7-(α-amino-isothiazol-4-yl-acetamido)decephalosporanic acid in collidine there are obtained 3-propionyloxymethyl-7-(α-amino-isothiazol-4-yl-
  acetamido)decephalosporanic acid,
3-butanoyloxymethyl-7-(α-amino-isothiazol-4-yl-
  acetamido)decephalosporanic acid,
3-pentanoyloxymethyl-7-(α-amino-isothiazol-4-yl-
  acetamido)decephalosporanic acid, and
3-benzoyloxymethyl-7-(α-amino-isothiazol-4-yl-
  acetamido)decephalosporanic acid.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. The compounds having the formula

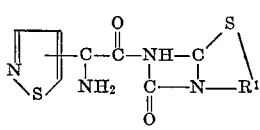

wherein $R^1$ is selected from the group consisting of:

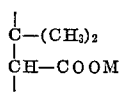

and

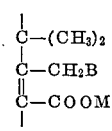

wherein M is hydrogen, a pharmaceutically acceptable nontoxic cation; an anionic charge when B is a quaternary ammonium radical; or when taken together with B, a monovalent carbon-oxygen bond; B is a member of the group consisting of hydrogen, hydroxyl, lower alkanoyloxy, benzoyloxy, a quaternary ammonium radical of the formula

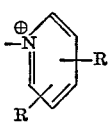

wherein each R is hydrogen or methyl; or when taken together with M, a monovalent carbon-oxygen bond.

2. A compound having the formula

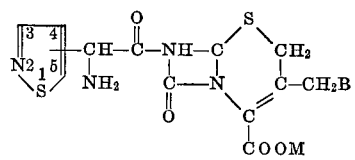

wherein B is hydrogen, hydroxyl, alkanoyloxy, having 2–8 carbon atoms, benzoyloxy, a quaternary ammonium radical of the formula

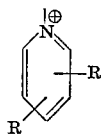

in which each R can be hydrogen or methyl; or, when taken together with M, a monovalent carbon-oxygen bond; and wherein M is hydrogen, a pharmaceutically acceptable nontoxic cation, an anionic charge when B is a quaternary ammonium radical, or, when taken together with B, a monovalent carbon-oxygen bond.

3. The compound of claim 2 wherein B is an acetoxy group.
4. The compound of claim 2 wherein B is hydrogen.
5. The compound of claim 2 wherein B is a quaternary ammonium radical in which each R is hydrogen.
6. A penicillin selected from the group of compounds consisting of acids having the formula

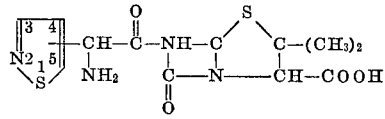

and the nontoxic, pharmaceutically acceptable salts thereof.

7. The compounds, as defined in claim 6, wherein the isothiazolyl group is bonded to the molecule via the 3-position.
8. The compounds, as defined in claim 6, wherein the isothiazolyl group is bonded to the molecule via the 4-position.
9. The compounds, as defined in claim 6, wherein the isothiazolyl group is bonded to the molecule via the 5-position.
10. A compound, as defined in claim 8, selected from the group consisting of 6-[D(−)-α-amino-4-isothiazolyl-acetamido]penicillanic acid and the nontoxic, pharmaceutically acceptable salts thereof.
11. A cephalosporin compound, as defined in claim 3, selected from the group consisting of 7-[α-amino-3-isothiazolylacetamido]cephalosporanic acid and the nontoxic, pharmaceutically acceptable salts thereof.
12. A cephalosporin compound, as defined in claim 3, selected from the group consisting of 7-[α-amino-4-isothiazolylacetamido]cephalosporanic acid and the nontoxic, pharmaceutically acceptable salts thereof.
13. A cephalosporin compound, as defined in claim 3, selected from the group consisting of 7-[α-amino-5-isothiazolylacetamido]cephalosporanic acid and the nontoxic, pharmaceutically acceptable salts thereof.

References Cited
UNITED STATES PATENTS
3,479,365  11/1969  Maito et al. _____ 260—239.1
3,481,922  12/1969  Holdrege _____ 260—239.1

NICHOLAS S. RIZZO, Primary Examiner

U.S. Cl. X.R.
260—243; 424—246, 271